United States Patent [19]
McElroy

[11] Patent Number: 5,008,841
[45] Date of Patent: Apr. 16, 1991

[54] NON-INVASIVE SYSTEM AND METHOD FOR INSPECTION OF VALVES

[75] Inventor: John W. McElroy, Newtown Square, Pa.

[73] Assignee: Liberty Technology Center, Inc., Conshohocken, Pa.

[21] Appl. No.: 387,223

[22] Filed: Jul. 28, 1989

[51] Int. Cl.$^5$ ..................... G21C 17/00; G08B 21/00; G01D 7/00

[52] U.S. Cl. ............... 364/551.01; 376/245; 137/553; 73/587; 73/DIG. 3; 340/686

[58] Field of Search ............. 364/550, 551.01, 552, 364/138; 73/4 R, 587, 603, DIG. 3; 376/204, 245, 258, 463; 137/551, 553, 554, 559; 340/540, 683, 686

[56] References Cited

U.S. PATENT DOCUMENTS

| | | | |
|---|---|---|---|
| 3,857,277 | 12/1974 | Moore | 73/28 |
| 3,859,619 | 1/1975 | Ishihara et al. | 340/238 |
| 4,429,578 | 2/1984 | Darrel et al. | 340/683 X |
| 4,498,495 | 2/1985 | Worwood et al. | 137/559 X |
| 4,507,976 | 4/1985 | Banko | 73/DIG. 3 X |
| 4,523,286 | 6/1985 | Koga et al. | 137/551 X |
| 4,535,629 | 8/1985 | Prine | 73/587 |
| 4,573,114 | 2/1986 | Ferguson et al. | 364/138 |
| 4,636,780 | 1/1987 | Thomas et al. | 340/683 X |
| 4,641,529 | 2/1987 | Lorenzi et al. | 73/601 |
| 4,737,774 | 4/1988 | Chapman et al. | 73/DIG. 3 X |
| 4,762,001 | 8/1988 | Wutke | 73/597 |
| 4,777,979 | 10/1988 | Twerdochlib | 137/554 |
| 4,782,702 | 11/1988 | Boone et al. | 73/597 |
| 4,833,453 | 5/1989 | Twerdochlib | 137/554 X |
| 4,849,655 | 7/1989 | Bennett | 73/DIG. 3 X |

FOREIGN PATENT DOCUMENTS

| | | | |
|---|---|---|---|
| 88/03241 | 5/1988 | European Pat. Off. | 137/554 |
| 0017079 | 1/1984 | Japan | 137/554 |
| 0228181 | 10/1986 | Japan | 137/554 |

OTHER PUBLICATIONS

Document entitled, "Application Guidelines for Check Valves in Nuclear Power Plants", *Electric Power Research Institute Project* 2233-20, Final Report, Jan. 1988.

Document entitled, "Significant Operation Experience Report", *Institute of Nuclear Power Operations*, Atlanta, Ga., Oct., 1986.

Document entitled, "Performance Monitoring of Swing Check Valves Using Magnetic Flux Signature Analysis", *Information Package Containing Selected MFSA Test Results*, Haynes, H. D., Eissenberg, D. M., May, 1989.

*Primary Examiner*—Joseph L. Dixon
*Attorney, Agent, or Firm*—Woodcock, Washburn, Kurtz, Mackiewicz & Norris

[57] ABSTRACT

A non-invasive system and method is provided for the inspection of check valves which combines acoustic and magnetic techniques. The acoustic and magnetic techniques are used to measure check valve disk motion and internal impacts or vibrations resulting from the disk motion.

22 Claims, 5 Drawing Sheets

NON-INVASIVE SYSTEM AND METHOD FOR INSPECTION OF VALVES

BACKGROUND OF THE INVENTION

This invention relates to valves and more particularly to a non-invasive system and method for the inspection of valves.

It may be explained here that generally a check-valve includes a housing and a movable element mounted in the housing for movement between an open position and a closed position and intermediate positions between the open and closed positions. The check-valve operates by allowing flow in one direction when the movable element is in the open position while preventing flow in the other when the movable element is in the closed position. The check valve has no external moving parts and, therefore, the position of the movable element and its integrity cannot be evaluated with normal visual inspection methods without valve disassembly.

Failures of a few check valves in applications directly related to a safe shut down of a nuclear powered electrical generating unit during nuclear power plant operations led to a review of all check valve maintenance actions and failures. INPO (Institute of Nuclear Power Operations) published the results of the review in a Significant Operating Experience Report (SOER) No. 86-03 entitled "Check Valve Failures or Degradation" in October, 1986. The conclusions of this report were that the major causes of check valve failures were primarily due to misapplication and inadequate preventative maintenance.

As a result of INPO's SOER 86-03, the electric industry worked with EPRI (the Electric Power Research Institute) and formed a program to address the needs of the industry. In 1988, EPRI issued a report entitled "Application Guidelines for Check Valves in Nuclear Power Plants." The EPRI report provided guidelines recommending the use of non-invasive inspection techniques to verify proper operation of check valves.

Currently, inspection of check valves is generally accomplished by the disassembly of the valve and visually inspecting the internals. There is a very limited use of non-invasive inspection techniques consisting of ultrasonic, acoustic or, to a limited extent, magnetic techniques. Acoustic techniques involve the detection of structural-borne noise, i.e., acoustic energy or vibrations, emanating from the internal workings of the valve. The acoustic technique generally employs a piezoelectric crystal sensor, such as an accelerometer, mounted on the valve housing. All structural-borne acoustic energy waves or vibrations are detected by the acoustic sensor and converted by it to electric analog voltage signals or data representative of acoustic energy. The data is recorded and then analyzed in an attempt to diagnose which internal valve condition the data is indicating.

Although the indications of various conditions and/or "problems" within the valve can be detected as vibrations by the acoustic sensor, the interpretation of the data as to which problem the acoustic energy or vibrations is indicating is difficult. For example, it is difficult at times, to differentiate between vibrations caused by impacts between worn parts and impacts which are expected in normal operation of the valve, i.e., impacts which occur upon the opening and closing of the valve. Also vibrations created by impacts caused by worn parts as the movable element fluctuates between open and closed positions can be misinterpreted as vibrations created by impacts caused by the movable member striking the valve housing or a valve stop in its fully opened position. It is also possible for the entire movable member to be missing with just the mounting arm which mounts the movable member to the housing remaining and obtain vibrations and resulting acoustic signatures in the data that might be misinterpreted as vibrations of impacts caused by the movable member striking the valve stop when, in fact, it is the mounting arm which is striking some portion of the valve's internal structure.

Magnetic techniques for the inspection of valves currently relate to systems which provide information regarding the position of the movable element of the valve. The magnetic technique involves the use of a permanent magnet mounted on the movable element to provide a varying magnetic field as the position of the movable element changes. A magnet field sensor is used to measure the magnetic field strength from a point outside the valve. As magnetic field strength changes, the sensor will indicate the position of the movable element. Knowing the position of the movable element permits limited diagnostic evaluation of check valves. For example, a fluctuating movable element will be evident using the magnetic technique. Proper seating of the movable element upon closure, however, would not be evident using magnetic techniques although the position of the movable element would indicate closed. Also, and more importantly, worn internal parts would not be evident using magnetic techniques.

Because of these and other difficulties associated with check valve inspection techniques presently employed, there now exists a need and a strong demand for an economical, viable means for the non-invasive inspection of check valves to verify proper operation without the disadvantages of the current inspection techniques.

SUMMARY OF THE INVENTION

It is a primary object of the present invention to provide a non-invasive system and method for the inspection of valves which combines acoustic and magnetic techniques in response to, and in satisfaction of, the aforementioned need and strong demand experienced in actual practice. For this purpose, the invention provides a non-invasive inspection system for a valve of the type including a housing and a movable element mounted in the housing for movement between an open position and closed position and intermediate positions between the open and closed positions. First means are provided for both detecting acoustic energy in the valve during an inspection interval and generating data representative of the detected acoustic energy. Second means are provided for both detecting signals indicative of the position of the movable element during an inspection interval and generating data representative of the detected signals. Third means are provided which are coupled to the first and second means for simultaneously receiving the data generated by the first and second means.

In accordance with another aspect of the present invention, a non-invasive method of inspecting a valve of the type having a housing and an internal element mounted in the housing for movement between open and closed positions and intermediate positions between the open and closed positions is provided. The method comprises the steps of: detecting acoustic energy in the valve during an inspection interval and generating data representative of the detected acoustic energy; detecting signals indicative of the position of the movable element during an inspection interval and generating data representative of the detected signals; recording the data generated for subsequent analysis and/or processing the data generated to place the data generated in a form for analysis whereby to detect various conditions within the valve.

Still another aspect of the invention is the provision of a dual sensor. The dual sensor comprises in combination: a container; first means disposed in the container for both detecting acoustic energy and generating data representative of the detected acoustic energy; and, second means disposed in the container for both detecting magnetic field strength signals and generating data representative of the detected signals.

The above and other objects, features and advantages of the present invention will be apparent from the following detailed description of a preferred embodiments thereof taken in conjunction with the accompanying drawings.

DESCRIPTION OF THE PREFERRED EMBODIMENTS

Figure 1:
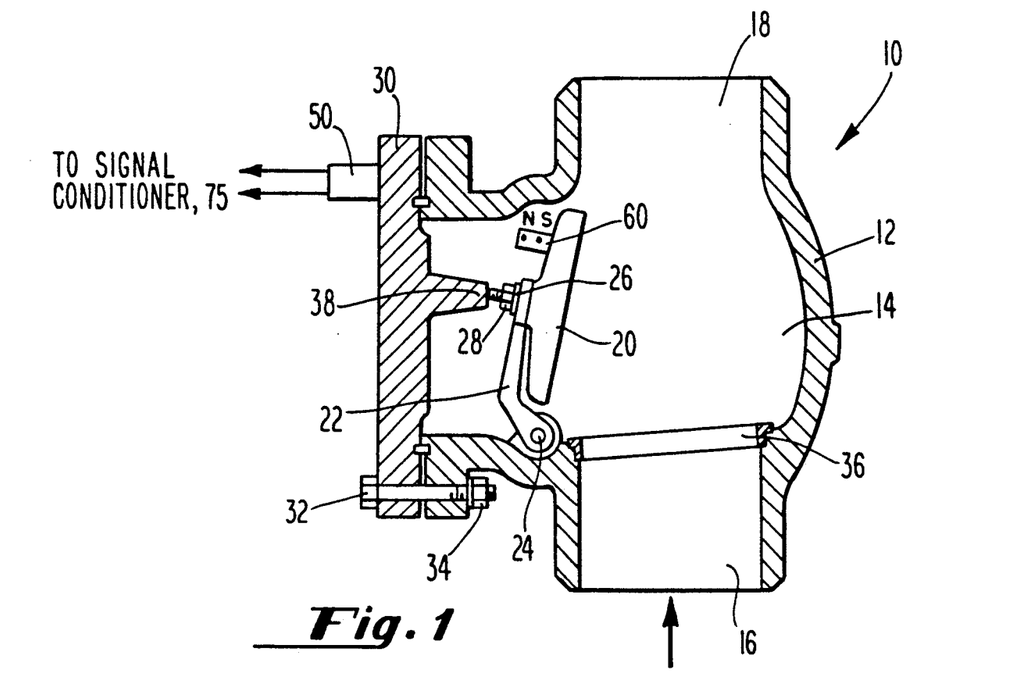
FIG. 1 is a cross-sectional, schematic view of a check valve illustrating its various parts and dual sensor mounted thereon in accordance with the invention.

Referring now to the drawings and first to FIG. 1, a so-called "swing check" valve is indicated generally at 10. The swing check valve is the most common check valve in use and the system and method in accordance with the invention will be described in association with the swing check valve. It is to be understood, however, that the system and method of the invention applies to all check valves including the so-called "tilting disk" check valve and the so-called "lift check" valve.

The swing check valve 10 comprises a valve body or housing 12 which has a chamber 14 therein and includes an inlet opening 16 and an outlet 18 which respectively communicate with opposite ends of the chamber 14. A movable element or disk 20 is hingedly supported on the housing 12 by hinge arm 22 and hinge pin 24. The disk 20 is disposed in the path of fluid flow from the inlet opening 16 to the outlet opening 18 and is mounted for pivotal movement about the hinge pin 24, generally toward the outlet opening 18, in response to fluid flow through the housing 12. The disk 20 is mounted on the hinge arm 22 by washer 26 and nut 28. Access to the interior of the valve is provided by means of removable valve bonnet 30 which is secured to valve housing 12 by bolts and nuts 32 and 34, respectively. Only one of such bolts and nuts are shown in FIG. 1. When the valve is closed, disk 20 is in engagement with disk seat 36 and when it is in its fully opened position, disk 20 contacts and rests against disk stop 38.

From the foregoing, it will be understood that disk 20 is movable between an open position with disk 20 resting against disk stop 38 and a closed position with disk 20 in engagement with disk seat 36 and, intermediate positions between the open and closed positions depending upon the level of fluid flow from the inlet opening 16 to the outlet opening 18.

When the check valve 10, as just described, is in new or "good" condition in a properly designed use or application, the disk 20 closes tightly against the disk seat 36 preventing back leakage. When such a "good" valve opens, tight clearances between internal parts prevents relative motion and excessive wear conditions. Also, the valve disk assembly, i.e., the hinge arm 22, disk 20, washer 26 and nut 28, will contact the disk stop 38 during the opening and should come to rest on the stop 38.

A valve in "poor" condition, i.e., with internal damage or in an inadequate design application, may not close tightly. That is, disk 20 may not close tightly against the disk seat 36 and back leakage may occur. When a "poor" valve opens, wear on the hinge pin 24 may cause the hinge pin 24 to rattle; wear on the hinge arm 22 may cause the arm 22 to rattle; and/or, wear on the disk nut 28 may cause the disk 20 to wobble. In addition, insufficient flow of fluid through the valve 10 causes the disk 20 to fluctuate to positions intermediate fully open and closed positions continuously and results in excessive wear on the hinge pin 24. If such fluctuations include the valve disk assembly striking the valve stop 38, excessive wear will occur on the disk nut 28 and hinge arm assembly, i.e., the hinge arm 22, the hinge pin 24 and their respective associated structures.

As alluded to above, because of recent industry concerns related to operation of and failures of check valves, it has become desireable to assure proper valve performance through non-invasive valve inspection. An effective inspection technique for check valves should be able to detect the following conditions: disk position; wear of internal parts; loose or missing internal parts; and, disk/disk seat leakage.

With respect to disk position, an effective inspection technique should be able to determine: stroke time, i.e., the time for the disk to move from the closed position to the open position; whether or not the disk is in the fully opened fully closed or intermediate position; flutter of the disk including the magnitude and frequency of the flutter; and, any contact with the disk seats/stops.

With respect to wear of internal parts, an effective inspection technique should be able to determine: hinge pin/bushing wear; seat/disk facing surfaces wear; and, disk to hinge arm connection wear.

With respect to seat leakage, an effective inspection technique should be able to determine: the presence of leakage; and, the rate of such leakage.

With an acoustic inspection technique seat leakage or back-leakage through the closed disk/disk seat area can be detected because such leakage causes broadband frequency acoustic energy waves, i.e., vibrations, to be input to the valve structure as the fluid flows between the disk/disk seat surfaces. These energy waves are detected by the acoustic sensor as a continuous energy level higher than the normal non-leaking condition. Therefore, back leakage can be detected.

Worn internal parts can be detected by an acoustic technique because worn internal parts create abnormal clearances allowing relative motion between those parts resulting in transient impact acoustic energy waves being input to the valve structure. These relatively low energy impacts are detected by the acoustic sensor as the disk assembly moves. Therefore, worn hinge pins or hinge arms, and loose, wobbling disks can be detected by acoustic inspection techniques.

A fluctuating disk that does not contact the disk stop or disk seat inputs no energy into the valve structure and, therefore, is not detectable by the use of an acoustic inspection technique. Once the disk makes contact with the disk stop, energy waves are impacted into the valve structure and can be detected by an acoustic inspection technique. The continued impacting of the disk to disk stop is discernible as discrete impact signatures with an acoustic inspection technique. The valve disk closing against the disk seat is also detectable as the disk impacts the disk seat. Normal closure is seen as a single discrete event while valves with worn parts and excessive clearance provide signatures that indicate multiple impacts as the seat wobbles into a steady state condition.

As indicated above, there are a number of disadvantages to utilizing acoustic inspection techniques alone for analyzing check valves. First, although various indications of conditions within the valve can be detected by the acoustic sensor, the diagnosing as to which problem or condition the acoustic signal is indicating is difficult. For instance, impacts caused by worn hinge pins or hinge arm and several impacts of the disk to disk stop may be difficult to differentiate. Also impacts created by worn parts as the disk fluctuates could be misinterpreted as disk to disk stop impacting. Another disadvantage with acoustic inspection techniques, is that no acoustic indication is available when the disk is fluttering without contacting the disk stop or disk seat. It is also possible for the entire disk to be missing with just the hinge arm remaining and get acoustic signatures that might be misinterpreted as disk to stop impacting as the hinge arm fluctuates and impacts the valve internal structure.

Figure 2A:
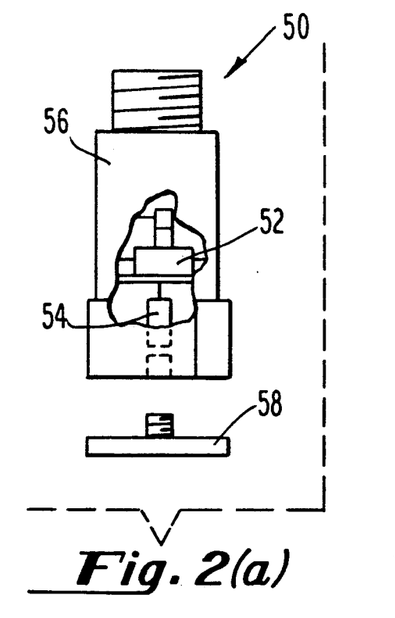
FIG. 2(a) is an enlarged, fragmentary view of the dual sensor in accordance with the invention.

In accordance with the invention, acoustic inspection techniques are coupled with magnetic inspection techniques in a novel manner to form a non-invasive inspection system and method that clearly diagnoses deteriorated conditions within the check valve. Referring again to FIG. 1, there is shown at 50 a sensor which preferably, as shown in FIG. 2, takes the form of a dual sensor comprised of a first means or accelerometer 52 and a second means or Hall effect generator 54 disposed in a single container 56. Of course, the accelerometer 52 and Hall effect generator 54 may be separate elements and be positioned in spaced apart relationship on the valve structure. The dual sensor 50 is attached to the valve bonnet 30 with mounting shoe 58 which is threadably received in the bottom of the container 56 of the dual sensor 50. The mounting shoe 58 may be attached to the bonnet 30 by bonding as, for example, by a suitable epoxy.

Figure 2B:
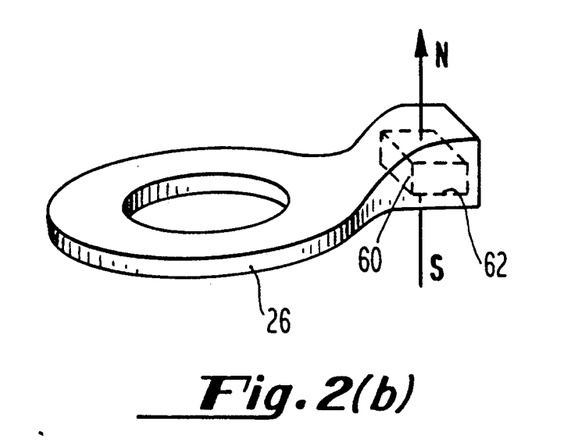
FIG. 2(b) is a washer assembly designed to secure a permanent magnet.

Also shown in FIG. 1 is a permanent magnet 60 mounted on the disk 20 for movement therewith with the North/South axis of the magnet 60 being disposed (North to South) perpendicular to the disk 20. A magnet with a strong magnetic field in terms of magnetic moment is preferred. The magnet field strength of the magnet 60 measured at either pole should be greater than 2 kilogauss. The magnet 60 may be mounted on the disk 20 by, for example, suitable epoxies, metal putties or welding. As shown in FIG. 2b, the magnet 60 may be located in an opening 62 provided in the washer 26. The magnet 60 may be located anywhere on the hinge arm/disk assembly for movement therewith. The placement of the permanent magnet 60 on the disk 20 or hinge arm 22 will provide a varying magnetic field as the position of the disk 20 changes. The magnetic field strength (in Gauss) as measured from a stationary point outside the valve is proportional to the position of the disk 20.

The accelerometer 52 may, for example, comprise a piezoelectric crystal accelerometer and functions to both detect acoustic energy or vibrations in the valve during an inspection interval and generate data in the form of analog voltage signals representative of the detected acoustic energy.

The Hall effect generator 54 may, for example, comprise a ceramic crystal such as indium arsenide, which has a transfer function of MV/Gauss. The Hall effect generator 54 generates data in the form of analog voltage signals representative of the detected signals, i.e., the changing magnetic field strength as the disk 20 and magnet 60 are in motion. The actual millivolt reading obtained from the sensor 54/electronic system (to be described below) once calibrated would indicate the position of the disk 20.

Figure 3:
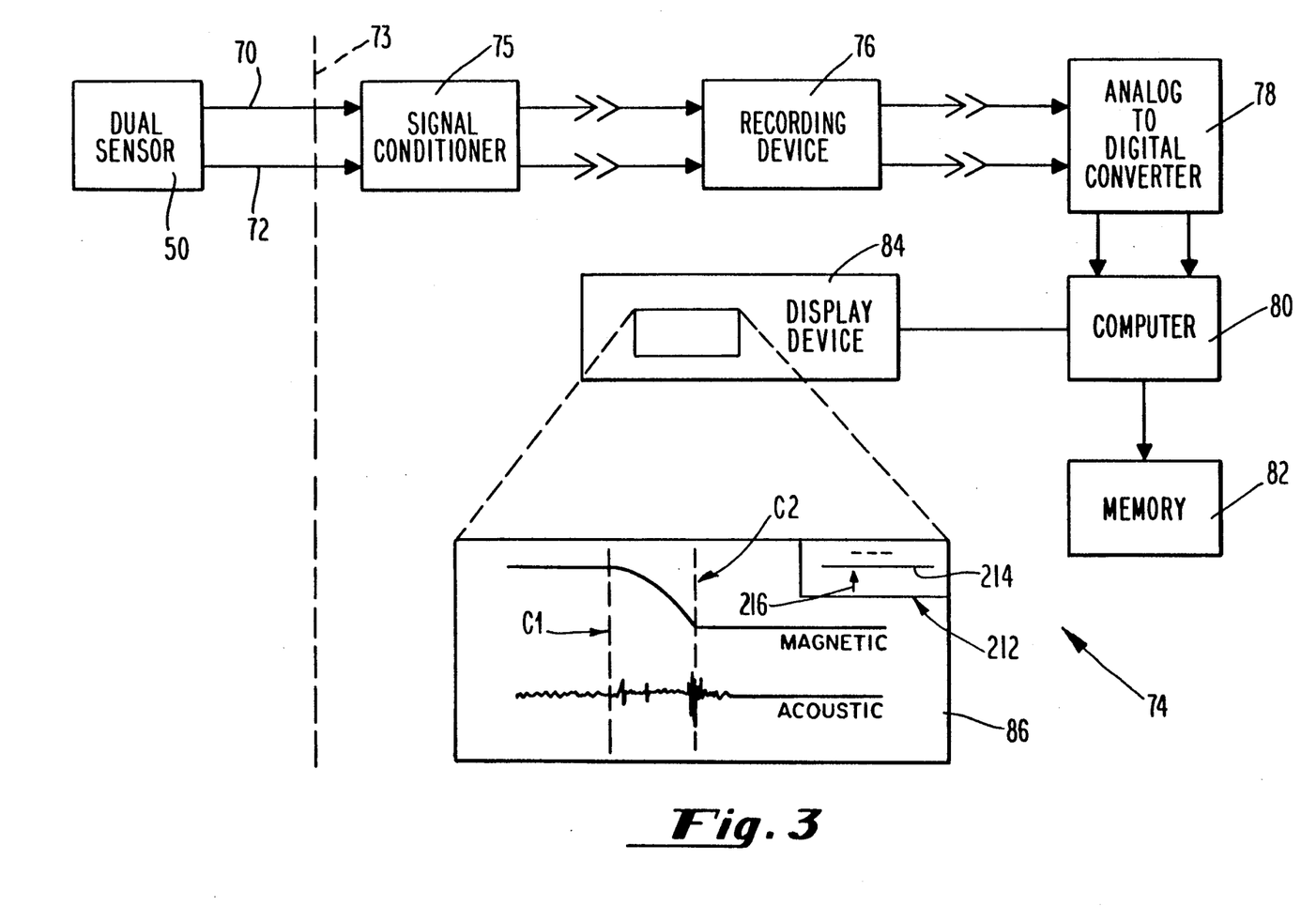
FIG. 3 is an overall block diagram of the non-invasive inspection system in accordance with the inventions.

Referring now to FIG. 3, an overall block diagram of the non-invasive inspection system in accordance with the invention is illustrated. The system comprises the dual sensor 50 which is coupled via leads 70 and 72 to third means or receiving means shown generally at 74. Essentially, the receiving means are shown to the right of the dashed vertical line 73 in FIG. 3. The leads 70 and 72 are coupled to the input of a signal conditioner 75. Signal conditioner 75 comprises gauss meter circuitry which converts the Hall effect generator output to an electrical voltage through amplification and filtering, and charge amplifier circuitry which converts the accelerometer output to an electrical voltage through charge to voltage conversion, amplification and filtering.

The signal conditioner 75 may be connected directly to a recording means or tape recorder 76 or to an analog to digital converter 78. When the system is used in the field, the signal conditioner 75 and recorder 76 may be brought to the location of the check-valve where the sensor 50 would be attached to the valve and the output signals from the sensor 50 would be recorded for subsequent analysis. The recorder 76 preferably includes an acoustic channel having a frequency response of 500 Hz to 10 kHz and a magnetic channel having a frequency response of 0 to 10 Hz.

At a permanent installation or in the event that the whole receiving means would be brought to a remote field location, the data from the dual sensor 50 could be input directly to the analog to digital converter 78 without first recording the data from the sensor 50.

In either event, the data generated by the sensor 50 is coupled to the analog to digital converter 78 which converts the analog voltage output signals generated by sensor 50 to digital voltage signals suitable for input to digital signal processing means or computer 80 which includes a memory 82 for storing data. The computer 20 is coupled to a display device 84 which provides a display 86 of data generated by the sensor 50 in a form suitable for analysis. The computer 20 is programmed to scan through the data input to it and locate significant data according to a predetermined algorithm. Most preferably the computer would locate data corresponding to impacts resulting from fluid flow through the valve or movement of the movable element or disk 20 and corresponding to the position of the disk 20 at the time of the internal impacts.

Program Description

Figure 11:
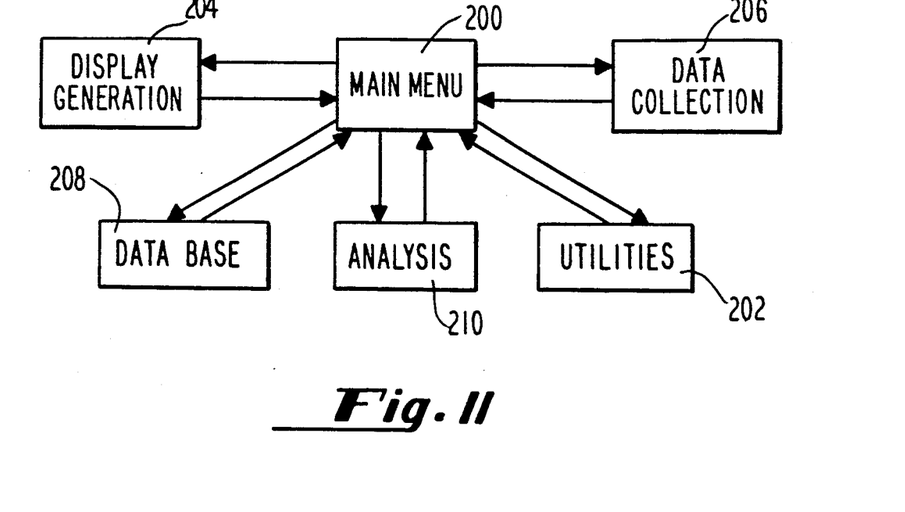
FIG. 11 is a block diagram of the computer program structure.

FIG. 11 shows a block diagram of the structure of the program (software system) used for check valve investigations. The Main Menu 200 is the overall control mechanism for utilizing the software routines. The Utilities 202 routine is used for maintenance on the computer system. Within the Utilities 202 routine would be system configuration, backup, file transfer, and DOS commands. The Display 204 routine contains a series of software modules used to present data on the screen 86. These modules include a preview of the data prior to data storage, data scrolling allowing scanning of data over relatively long periods of time, zooming capabilities about a cursor, and a Fast Fourier Transform (FFT). The Data Collection 206 routines receives data from the Analog to Digital Converter 78 and enters it into a file format. Through the use of previewing the data, storage onto disk can be accomplished without any analysis of the data. The Data Base 208 routines contain all valve data taken from different plants, i.e., remote valve locations, along with information from the nameplate and tags on the valve. The Data Base 205 allows data comparisons between different tests on the same valve. The Data Analysis 210 routines contain the methods and calculations required to analyze the data to determine the condition of the valve. These calculations include time at cursors C1 and C2, acoustic and magnetic values at cursors, RMS level between cursors, Peak level between cursors, and FFT between cursors. The Analysis 210 routines also include standard reports that can be output to a printer (not shown).

In order to properly analyze check valves with the acoustic signature, nearly ten seconds of data must be viewed by the analyst to assure the valve is stable. The acoustic channel must have an upper limit of frequency response of 5 KHz. The A/D converter 78 must collect 20,000 samples per second to achieve a 5 KHz frequency response. Therefore, 200,000 samples will be collected in the ten second data collection period. The problem here is that only 1,000 samples can be displayed at any time with state-of-the-art computer equipment. Therefore, the software routines must be able to quickly locate and present data requiring analysis.

Figure 12:
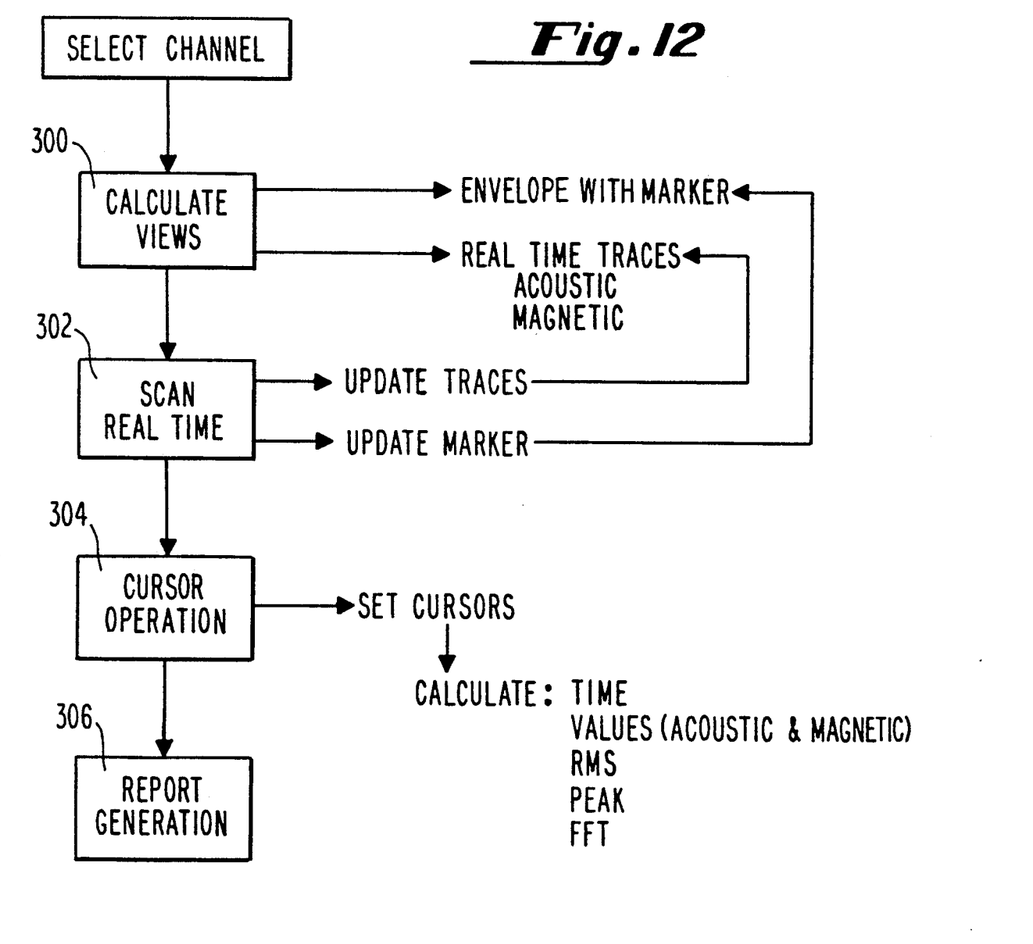
FIG. 12 is a flow diagram useful to explain the analysis of collected data from a check valve.

FIG. 12 is a flow diagram used to analyze the data collected from a check valve. Note in FIG. 3 that the screen is divided into two parts 300, the real time part showing the magnetic and acoustic traces and an envelop part 212. The ten second data sample is enveloped to allow the entire ten seconds' profile 214 to be presented within the envelop section 212 of the display. The first 1,000 samples or 1/200th of the 10 second data sample is presented 302. The real time acoustic and magnetic traces are displayed (See FIG. 3). The analyst can scan all ten seconds of data by computer command 302. Where in the ten seconds of data the 1,000 samples on the real time display is located, is shown by a marker 216 under the envelop trace (See FIG. 3). This enables the analyst to quickly focus on pertinent data.

Cursor operation 304 is the tool the analyst uses to examine the data and determine the condition of the check valve. With multiple cursors C1 and C2, the following can be accomplished.

Time between impacts
Acoustic RMS level for leak detection
Peak value between cursors
Magnetic and Acoustic values at cursor
FFT of Acoustic signal between cursor
Correlate Acoustic Impacts with Magnetic trace Following the analysis, a report 306 can be generated to provide a hard copy record.

From the foregoing description and, in accordance with the invention, it will be understood to those skilled in the art that the output data of the Hall effect generator 54 indicates the position of the disk 20 coincident with the detection of impacts within the valve or acoustic signatures, i.e., output data of the accelerometer 52, indicating a valve condition such as would result from fluid flow through the valve or movement of the disk 20. As will be further explained with reference to FIGS. 4–10, the knowledge of the position of the disk 20 at the time of the detection of an acoustic event provides the necessary discernment required to analyze the diagnostic meaning of the acoustic events, i.e., impacts or vibrations within the valve structure.

Also from the foregoing, it will be understood that the receiving means 74 may comprise the recorder 76 for recording the data generated by the dual sensor 50 or the data processing means which comprises the analog to digital converter 78, the digital processing means or computer 80 and the display means 84. The data processing means processes the data generated by the first means or accelerometer 52 and second means or Hall effect generator 54 to place the data generated by the accelerometer 52 and Hall effect generator 54 in a form for analysis.

Figure 4:
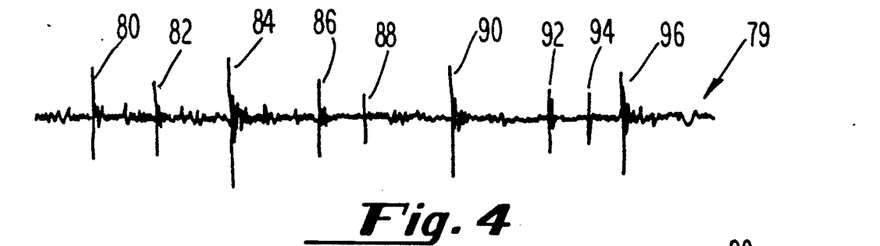
FIGS. 4–10 are diagrammatic acoustic and magnetic tracings useful to explain the system and method in accordance with the invention.
Figure 5:
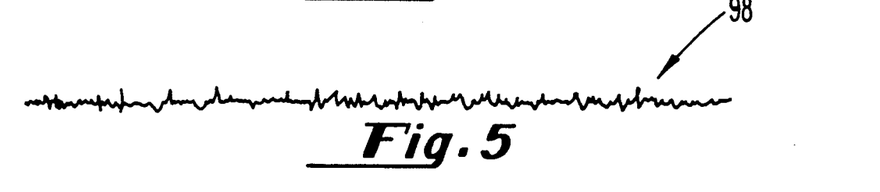

Referring now to FIGS. 4–10, these figures are diagrammatic, acoustic and magnetic tracings as might appear on the display 86. Each of the traces comprise or represent approximately five milliseconds from ten seconds of recorded and processed data from the output of the accelerometer 52 and/or Hall effect generator 54. The computer 20 has scanned the data and selected this data for display in accordance with its program because, for example, the level of the signals as at 80-96 in the trace 79 of FIG. 4 is above a predetermined level. The signals at 80-96 represent multiple impacts occurring within the valve. Diagnosing this acoustic signature would indicate several possible conclusions. The trace of FIG. 4 could be indicating disk 20 to disk stop 38 impacting or disk 20 fluttering with hinge pin 24 wear or looseness or disk 28 to disk seat 36 impacting or any combination of these. FIG. 5 is an acoustic trace with no apparent impacting. Diagnosing the trace 98 of FIG. 5 could lead to two conclusions. Either the disk 28 is fluttering with no impacting or the valve internal parts are not moving. Thus, reviewing the acoustic traces of FIGS. 4 and 5 alone will not provide complete diagnostics of the internal workings of the valve.

Figure 6:
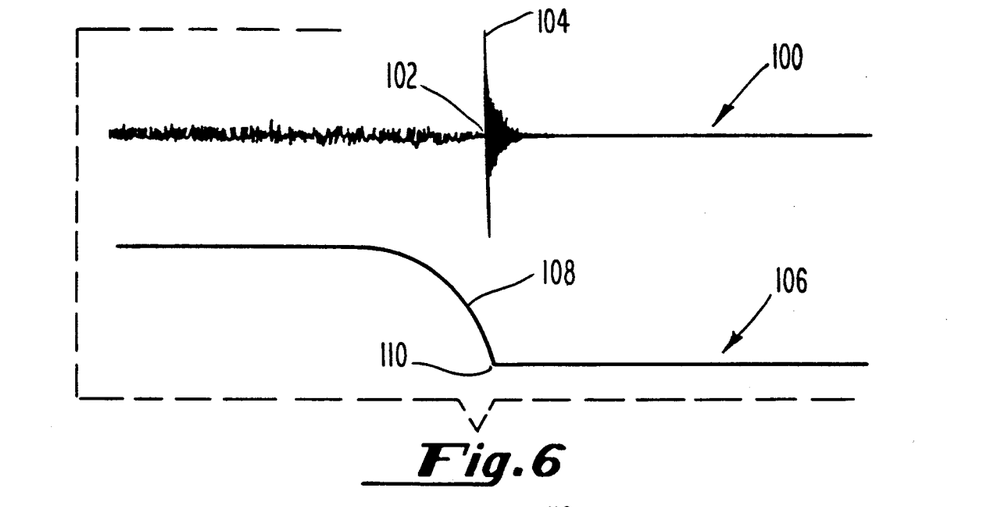

Referring now to FIG. 6, which shows the response of both sensor 52 and 54 to a check valve closure. On the acoustic trace 100, flow noise is seen to decrease, as at 102, followed by an impact signature, as at 104, of the disk 20 making contact with the seat 36. This analysis is confirmed by the magnetic trace 106. The magnetic signature of the valve closing shows the magnetic field strength decreasing, as at 108, to the seat or closed position, as at 110.

Figure 7:
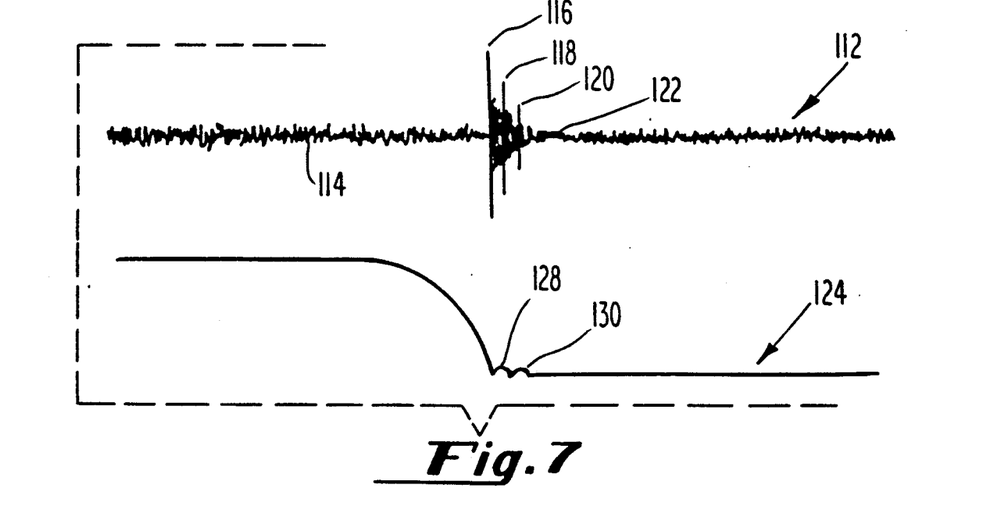

FIG. 7 shows the response of both sensors 52 and 54 to a check valve closing with several bounces of the disk 20 and improper valve seating, i.e., closing. The acoustic signature 112 shows flow noise, as at 114, up to the point where the disk 20 impacts the seat 36 three times, as at 116, 118, 120, followed by substantial leak flow noise, as at 122, indicating either a degraded disk 20 or an improperly seated disk 20. The magnetic trace 124 shows the disk closing, as at 126, with a bounce signature present, as at 128 and 130.

Figure 8:
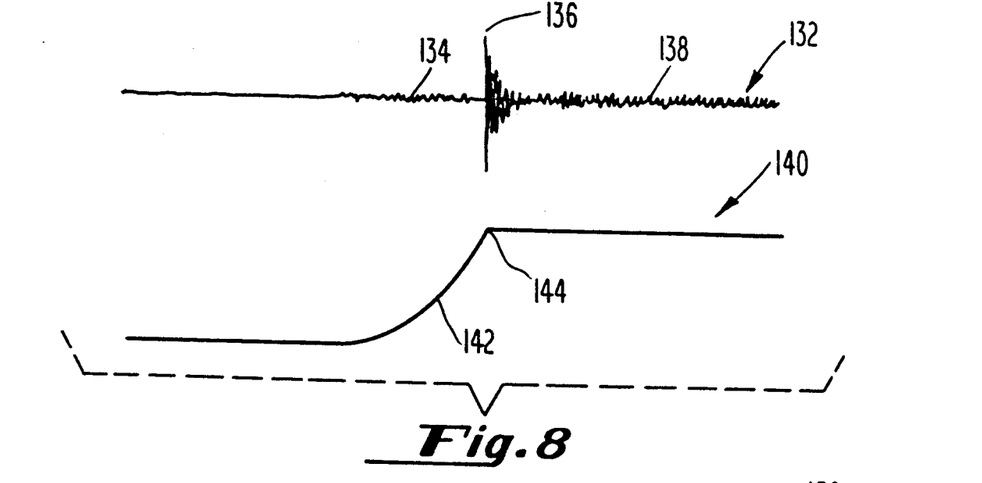

FIG. 8 shows the response of both sensors 52 and 54 for a check valve opening. The acoustic signature 132 begins to show flow noise, as at 134, followed by impact with the disk stop 38, as at 136, and cOnsequent floW noise as at 138. The magnetic trace 140 shows the valve opening, as at 142, with the disk 20 coming to a stop at the impact with the disk stop 38, as at 144.

Figure 9:
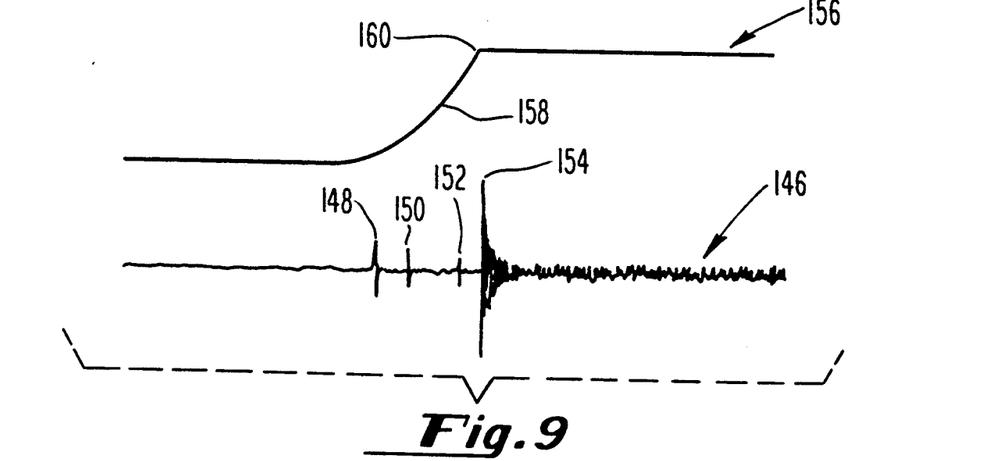

FIG. 9 shows the response of both sensors 52 and 54 to a valve opening with possible hinge pin wear or excessive looseness. The acoustic trace 146 shows several small impact signatures, as at 148, 150 and 152, prior to the disk 20-to-disk stop 38 impact as at 154. These precursor impacts, 148, 150 and 152, are a result of movement due to excessive clearances within the mechanical assembly of the check valve. This indicates possible hinge pin wear or excessive looseness. The magnetic trace 156 shows the valve opening, as at 158, with the disk 20 coming to a stop at the impact with the disk stop 38, as at 160.

Figure 10:
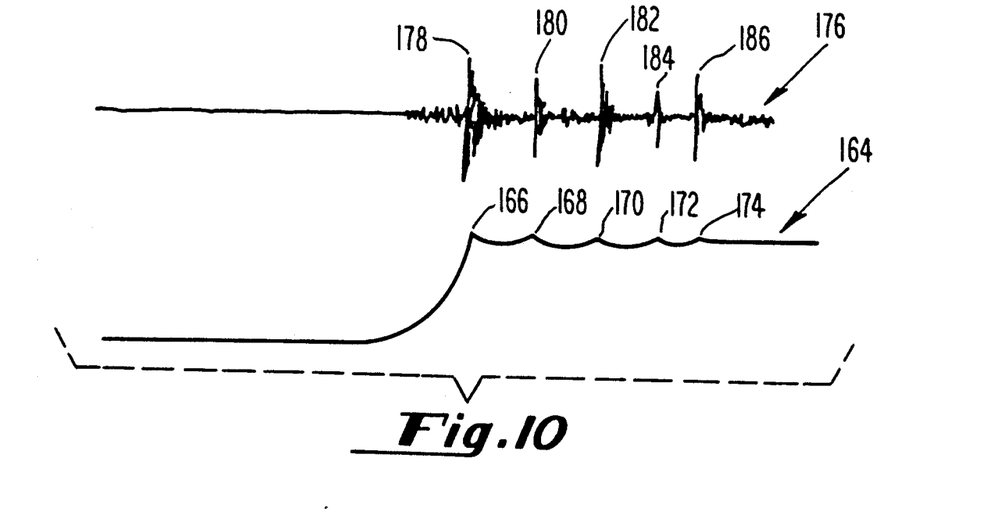

Referring now to FIG. 10 which shows the response of both sensors 52 and 54 to a valve opening. The magnetic trace 164 shows the disk is unstable causing excessive fluttering with impacts between the disk 20 and disk stop 38, as at 166–174. The acoustic trace 176 also shows such multiple impacts as at 178–186 consistent with the magnetic trace indicating fluttering.

From the foregoing, it will be understood that a non-invasive system and method for the inspection of valves has been provided which can be used to address INPO SOER 86-03 and ASME code In-Service Testing requirements.

Although I have described my invention by reference to particular illustrative embodiments thereof, many changes and modifications of the invention may become apparent to those skilled in the art without departing from the spirit and scope of my invention. I therefore intend to include, within the patent warranted hereon, all such changes and modifications as may reasonably and properly be included within the scope of my contribution to the art.

I claim:

1. A non-invasive monitoring system for a valve of the type including a housing and a movable element mounted in the housing for movement between an open position and a closed position and intermediate positions between the open and closed positions comprising:
    (a) first means for both detecting acoustic energy produced by the valve during a monitoring interval and generating data representative of the detected acoustic energy;
    (b) second means for both detecting signals indicative of the position of the movable element during the monitoring interval and generating data representative of the detected signals; and
    (c) third means coupled to the first and second means for simultaneously receiving the data generated by the first and second means and providing data from which a condition of the valve can be determined by a user.

2. A non-invasive monitoring system according to claim 1 wherein the third means comprises recording means for recording the data generated by the first and second means.

3. A non-invasive monitoring system according to claim 1 wherein the third means comprises data processing means for processing the data generated by the first and second means to place the data generated by the first and second means in a form for analysis.

4. A non-invasive monitoring system according to claim 3 wherein the data processing means comprises:
    (a) computer means programmed to identify significant data corresponding to impacts of internal elements of the valve resulting from movement of the movable element and corresponding to the position of the movable element at times that substantially coincide with the internal impacts; and
    (b) display means coupled to the computer means and responsive to the significant data to provide a display of the significant data.

5. A non-invasive monitoring system according to claim 1 wherein the first means comprises an accelerometer.

6. A non-invasive monitoring system according the claim 5 wherein the accelerometer comprises a piezoelectric crystal accelerometer.

7. A non-invasive monitoring system according to claim 1 wherein the second means comprises magnetic field generating means mounted on the movable element for movement therewith to provide a varying magnetic field as the position of the movable element changes, and magnetic field strength sensing means for detecting the strength of the magnetic field provided by the magnetic field generating means and for generating signals proportional to the strength of the magnetic field detected thereby.

8. A non-invasive monitoring system according to claim 7 wherein said magnetic field generating means comprises a permanent magnet and said magnetic field strength sensing means comprises a Hall effect generator.

9. A non-invasive monitoring system according the claim 1 wherein the first means comprises a piezoelectric crystal accelerometer and the second means comprises a permanent magnet mounted on the movable element for movement therewith and a Hall effect generator.

10. A non-invasive monitoring system according to claim 9 wherein the piezoelectric crystal accelerometer and the Hall effect generator are disposed within a single container, the container being mounted on the exterior of the valve housing.

11. A non-invasive monitoring system according to claim 1 wherein the first means generates data in the form of analog voltage signals representative of the detected acoustic energy; the second means generates data in the form of analog voltage signals representative of the detected signals; and wherein the third means comprises data processing means for processing the data generated by the first and second means to place the data generated by the first and second means in a form for analysis; the data processing means comprising:

(a) analog to digital converter means for converting the analog voltage signals generated by the first and second means to digital voltage signals;

(b) digital signal processing means coupled to the analog to digital converter means and programmed to locate digital voltage signals corresponding to impacts of internal elements of the valve resulting from movement of the movable element and corresponding to the position of the movable element at times that substantially coincide with the internal impacts; and (c) display means operatively coupled to the digital signal processing means and responsive to the located digital voltage signals to provide a display of the located digital voltage signals.

12. A non-invasive method of monitoring a valve of the type having a housing and an internal element mounted in the housing for movement between open and closed positions and intermediate positions between the open and closed positions comprising the steps of:

(a) detecting acoustic energy produced by the valve during a monitoring interval and generating data representative of the detected acoustic energy;

(b) detecting signals indicative of the position of the movable element during the monitoring interval and generating data representative of the detected signals; and (c) processing the data generated in steps (a) and (b) to place the data generated in steps (a) and (b) in a form for detecting various conditions within the valve.

13. A non-invasive method of monitoring a valve according to claim 12 wherein step (c) comprises:

(i) identifying significant data corresponding to impacts of internal elements of the valve resulting from movement of the movable element and corresponding to the position of the movable element at times that substantially coincide with the internal impacts; and (ii) displaying said significant data.

14. A non-invasive method of monitoring a valve of the type having a housing and an internal element mounted in the housing for movement between open and closed positions and intermediate positions between the open and closed positions comprising the steps of:

(a) detecting acoustic energy produced by the valve during a monitoring interval and generating data representative of the detected acoustic energy;

(b) detecting signals indicative of the position of the movable element during the monitoring internal and generating data representative of the detected signals; and (c) recording the data generated in steps (a) and (b) for subsequent analysis.

15. A non-invasive method of monitoring a valve according to claim 14 further comprising the step of:

(d) processing the data recorded in step (c) to place the recorded data in a form for analysis.

16. A non-invasive method of monitoring a valve according to claim 15 further comprising the step of:

(e) analyzing the data processed in step (d) to detect various conditions within the valve.

17. A non-invasive method of monitoring a valve of the type having a housing and an interval element mounted in the housing for movement between open and closed positions and intermediate positions between the open and closed positions, the moveable element having a permanent magnet located thereon for movement therewith, comprising the steps of:

(a) mounting an accelerometer and a Hall effect generator on the exterior of the housing; and (b) processing the output signals of the accelerometer and the Hall effect generator to place the same in a form for detecting various conditions within the valve.

18. A non-invasive method of monitoring a valve according to claim 17 wherein step (b) comprises:

(i) locating output signals of the accelerometer corresponding to internal impacts resulting from movement of the movable element;

(ii) locating output signals of the Hall effect generator corresponding to the position of the movable element at times that substantially coincide with the internal impacts; and (iii) displaying the located output signals of the accelerometer and the Hall effect generator for analysis.

19. A non-invasive method of monitoring a valve of the type having a housing and an internal element mounted in the housing for movement between open and closed positions and intermediate positions between the open and closed positions, the movable element having a permanent magnet located thereon for movement therewith, comprising the steps of:

(a) mounting a piezoelectric accelerometer and a Hall effect generator on the exterior of the housing;

(b) effecting movement of the movable element; and (c) during step (b) simultaneously recording the output signals of the accelerometer and the output signals of the Hall effect generator.

20. A non-invasive method of monitoring a valve according to claim 19 further comprising the step of:

(d) processing the recorded output signals of the accelerometer and the recorded output signals of the Hall effect generator to place the same in a form for analysis.

21. A non-invasive method of monitoring a valve according to claim 20 wherein step (d) comprises:

(i) identifying significant output signals of the accelerometer corresponding to impacts of internal elements of the valve resulting from movement of the movable element and identifying significant output signals of the Hall effect generator corresponding to the position of the movable element at times that substantially coincide with the internal impacts; and (ii) displaying the significant output signals of the accelerometer and Hall effect generator for analysis.

22. A non-invasive method of monitoring a valve according to claim 21 further comprising the step of:

(e) analyzing the data processed in step (d) to detect various conditions within the valve.

* * * * *

UNITED STATES PATENT AND TRADEMARK OFFICE
CERTIFICATE OF CORRECTION

Reexamination
Certificate
PATENT NO. : B1 5,008,841
DATED : September 19, 1995
INVENTOR(S) : John W. McElroy It is certified that error appears in the above-indentified patent and that said Letters Patent is hereby corrected as shown below:

Title page, item [73], Assignee: should read--Liberty Technologies, Inc. Conshohocken, Pennsylvania--.

Signed and Sealed this

Twelfth Day of March, 1996

*Attest:*

BRUCE LEHMAN

*Attesting Officer*  *Commissioner of Patents and Trademarks*

REEXAMINATION CERTIFICATE (2676th)

United States Patent [19]

McElroy

[11] B1 5,008,841

[45] Certificate Issued  Sep. 19, 1995

[54] NON-INVASIVE SYSTEM AND METHOD FOR INSPECTION OF VALVES

[75] Inventor: John W. McElroy, Newtown Square, Pa.

[73] Assignee: Allied-Signal Inc., Morris Township, Morris County, N.J.

Reexamination Request:
No. 90/002,944, Jan. 29, 1993

Reexamination Certificate for:
Patent No.: 5,008,841
Issued: Apr. 16, 1991
Appl. No.: 387,223
Filed: Jul. 28, 1989

[51] Int. Cl.⁶ ............ G21C 17/00; C08B 21/00; G01D 7/00
[52] U.S. Cl. ............... 364/551.01; 376/245; 137/553; 73/587; 73/DIG. 3; 340/686; 324/207.2; 324/207.14
[58] Field of Search ......... 364/550, 551.01, 552, 364/138; 73/4 R, 587, 596, 592, 572; 376/206, 245, 258, 463, 252; 137/551, 553, 554, 559; 340/540, 683, 686; 367/99, 96, 108, 180; 324/207.2, 207.26

[56] References Cited

U.S. PATENT DOCUMENTS

| | | | |
|---|---|---|---|
| 1,919,480 | 7/1933 | Rieber | 367/99 |
| 3,427,866 | 2/1969 | Weighart | 367/99 |
| 3,859,619 | 1/1975 | Ishihara et al. | 73/572 |
| 4,542,652 | 9/1985 | Reuter et al. | 73/597 |
| 4,543,649 | 9/1985 | Head et al. | 367/96 |
| 4,618,824 | 10/1986 | Magee et al. | 324/207.26 |
| 4,977,778 | 12/1990 | Nafziger et al. | 73/597 |

FOREIGN PATENT DOCUMENTS

| | | | |
|---|---|---|---|
| 1153114 | 8/1983 | Canada | 137/554 |
| 2478255 | 9/1981 | France | 137/554 |
| 0068581 | 3/1983 | Japan | 137/554 |

OTHER PUBLICATIONS

Koperda et al.; "Ultrasonic Position Indicator"; IBM Technical Disclosure Bulletin; vol. 27, No. 3, Aug. 1903.
EPRI–Application Guidelines for Check Valves in Nuclear Power Plants (and Appendix "D") Jan. '88.
NPAR Montly Reports Jan. 1987–Sep. 1987.
Tek Products–1985 Catalog.
Performance Monitoring of Swing Check Valves Using Magnetic Flux Signature Analysis by Haynes & Eissenberg May 1989.
Proposed Technique for Monitoring Check Valve Performance by William M. Suslick Oct. 1986.
National Instruments–1987 Catalog.
Document entitled, "Application Guidelines For Check Valves in Nuclear Power Plants", *Electric Power Research Institute* Project 2233-20, Final Report, Jan., 1988.
Document entitled, "Significant Operating Experience Report" *Institute of Nuclear Power Operations*, Atlanta, Ga., Oct., 1986.

*Primary Examiner*—Ellis B. Ramirez

[57] ABSTRACT

A non-invasive system and method is provided for the inspection of check valves which combines acoustic and magnetic techniques. The acoustic and magnetic techniques are used to measure check valve disk motion and internal impacts or vibrations resulting from the disk motion.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-22 is confirmed.

New claims 23-25 are added and determined to be patentable.

23. *A non-invasive montoring system for a valve of the type including a housing and a movable element mounted in the housing for movement between an open position and a closed position and intermediate positions between the open and closed positions comprising:*
   *(a) first means for both detecting acoustic energy produced by the valve during a monitoring interval and generating data representative of the detected acoustic energy;*
   *(b) second, magnetic field generating and sensing means for both detecting signals indicative of the position of the movable element during the monitoring interval and generating data representative of the detected signals; and*
   *(c) third means coupled to the first and second means for simultaneously receiving the data generated by the first and second means and providing data from which a condition of the valve can be determined by a user.*

24. *A non-invasive method of monitoring a valve of the type having a housing and an internal element mounted in the housing for movement between open and closed positions and intermediate positions between the open and closed positions comprising the steps of:*
   *(a) detecting acoustic energy produced by the valve during a monitoring interval and generating data representative of the detected accoustic energy;*
   *(b) detecting magnetic signals indicative of the position of the movable element during the monitoring interval and generating data representative of the detected magnetic signals; and*
   *(c) processing the data generated in steps (a) and (b) to place the data generated in steps (a) and (b) in a form for detecting various conditions within the valve.*

25. *A non-invasive method of monitoring a valve of the type having a housing and an internal element mounted in the housing for movement between open and closed positions andintermediate positions between the open and closed positions comprising the steps of:*
   *(a) detecting acoustic energy produced by the valve during a monitoring interval and generting data representative of the detected acoustic energy;*
   *(b) detecting magnetic signals indicative of the position of the movable element during the monitoring internal and generating data representative of the detected magnetic signals; and*
   *(c) recording the data generated in steps (a) and (b) for subsequent analysis.*

* * * * *